April 7, 1942.  A. LENNING ET AL  2,278,661

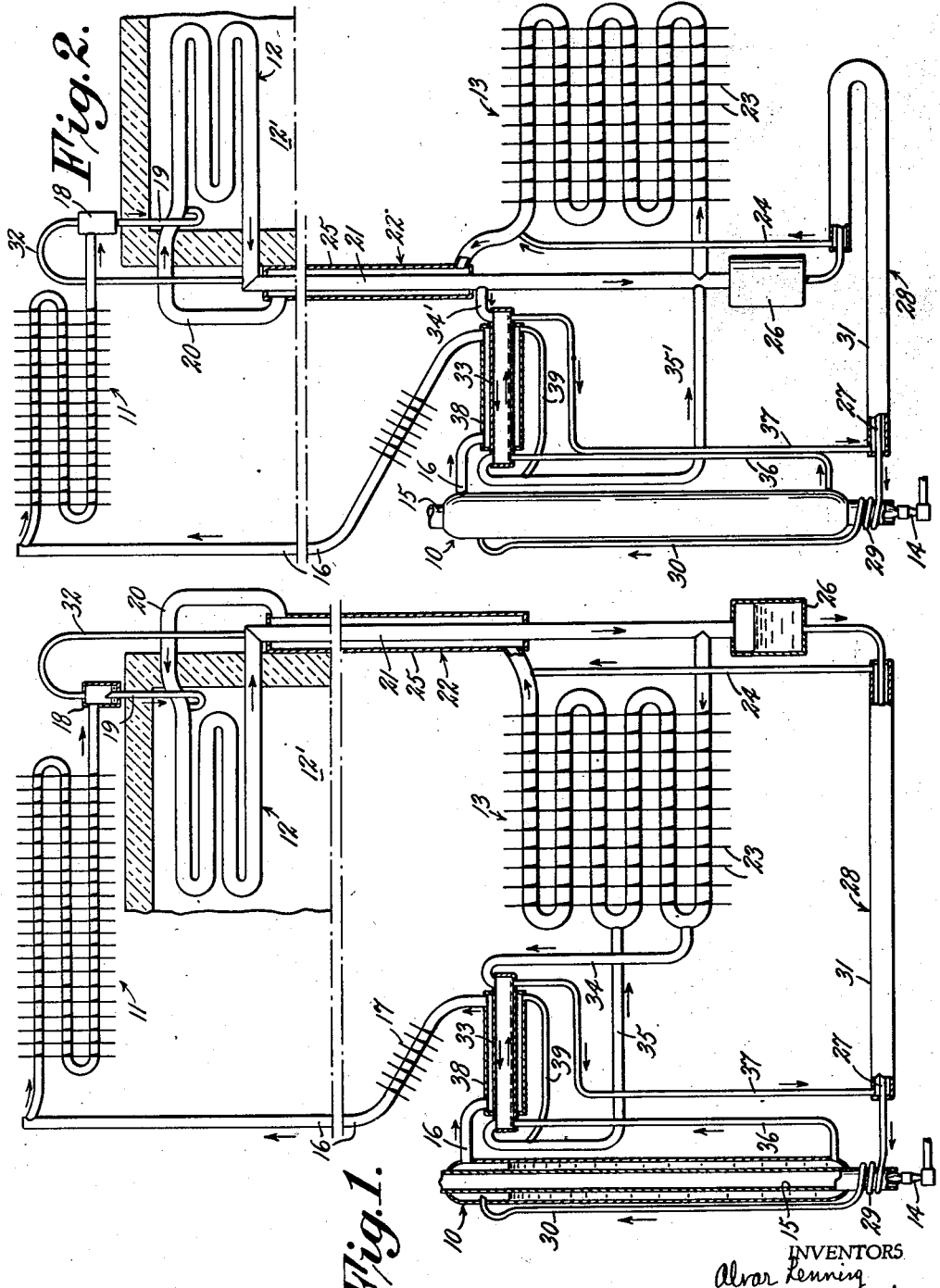

REFRIGERATION

Filed May 11, 1938  3 Sheets-Sheet 3

INVENTORS
Alvar Lenning
Per Paul Strandberg
BY Elf Fenander
their ATTORNEY.

Patented Apr. 7, 1942

2,278,661

UNITED STATES PATENT OFFICE 2,278,661

REFRIGERATION

Alvar Lenning and Per Paul Strandberg, Stockholm, Sweden, assignors, by mesne assignments, to Servel, Inc., New York, N. Y., a corporation of Delaware Application May 11, 1938, Serial No. 207,256
In Germany May 19, 1937

7 Claims. (Cl. 62—119.5)

This invention relates to refrigeration, and more particularly to a refrigeration system employing evaporation of refrigerant fluid in the presence of an inert gas.

It is an object of the invention to provide improved circulation of fluid in refrigeration systems of this type, particularly to effect a lower concentration of refrigerant in absorption liquid.

This is accomplished by providing a circuit for inert gas into which refrigerant fluid is vaporized from weak absorption liquid flowing from a place of vapor expulsion to a place of absorption. Further, the heat of rectification from vapors flowing from the place of vapor expulsion is utilized to effect evaporation of refrigerant fluid into the insert gas from weak absorption liquid.

The invention, together with the above and other objects and advantages thereof, will be better understood upon reference to the following description and the accompanying drawings forming a part of this specification, and of which:

Fig. 1 illustrates more or less diagrammatically a refrigeration system embodying the invention;

Fig. 2 illustrates a modification of the invention shown in Fig. 1;

Figure 3:
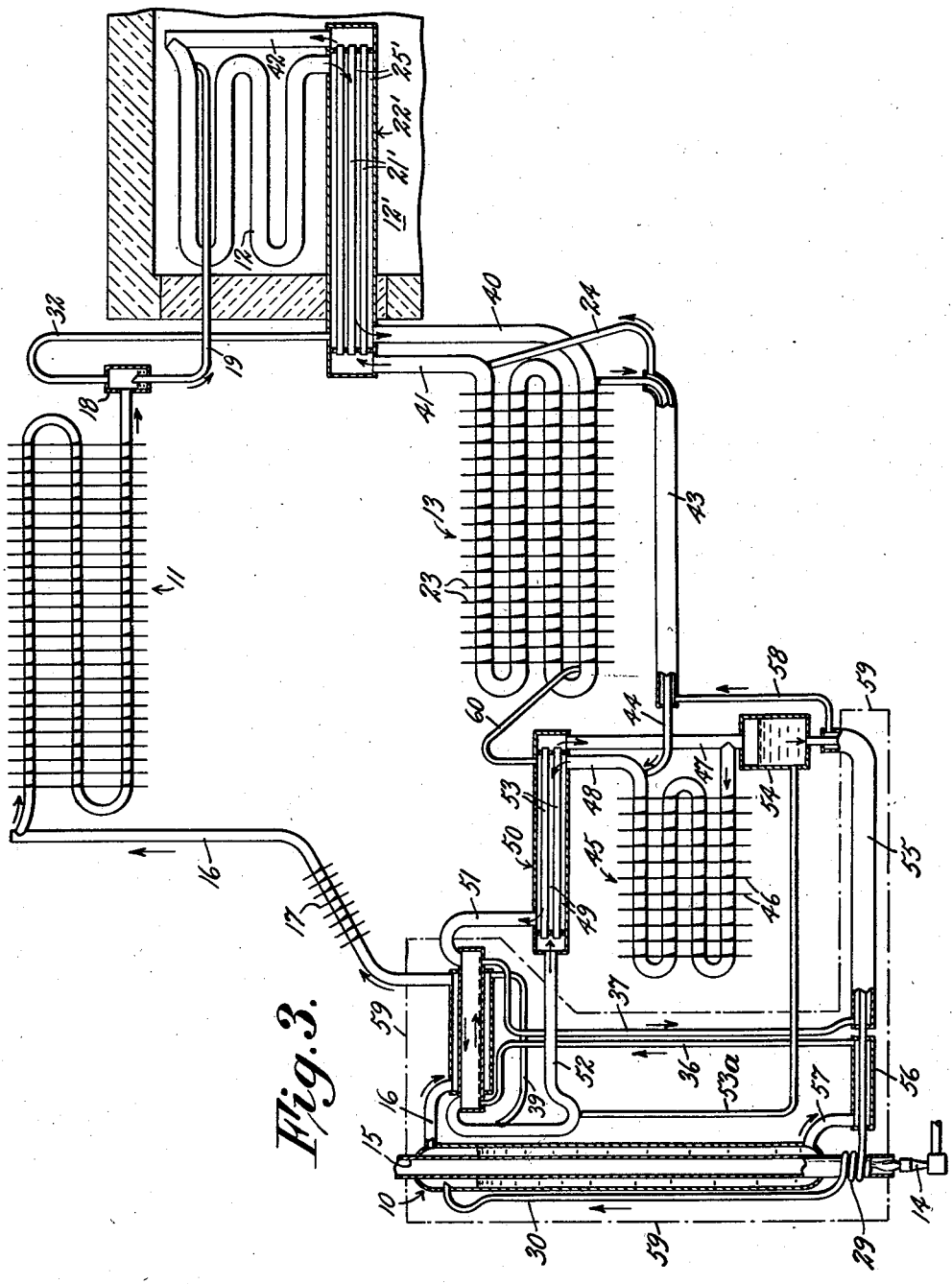
Fig. 3 illustrates more or less diagrammatically another modification of the invention shown in Figs. 1 and 2.

In Fig. 1 the invention is embodied in an absorption refrigeration system of a uniform pressure type containing a pressure equalizing gas. Such a system includes a generator 10, condenser 11, evaporator 12 and absorber 13. The system contains a solution of refrigerant in absorption liquid, such as ammonia in water, for example, and also an auxiliary agent or inert gas, such as hydrogen.

The generator 10 is heated in any suitable manner, as by a burner 14, for example, which projects its flame into the lower end of a flue 15. By heating generator 10, refrigerant vapor is expelled out of solution and flows upward into condenser 11 through a conduit 16 in which is connected an air-cooled rectifier 17.

In condenser 11 refrigerant vapor is condensed into liquid which flows therefrom into a gas separating chamber 18, and thence through a conduit 19 into the upper part of evaporator 12 which may be arranged in a thermally insulated space 12'. Liquid refrigerant in evaporator 12 evaporates and diffuses into inert gas which enters through a conduit 20, thereby producing a refrigerating effect.

The rich gas mixture of refrigerant vapor and inert gas formed in evaporator 12 flows from the lower part thereof through an inner conduit 21 of a gas heat exchanger 22 and into the lower end of absorber 13. The absorber 13 is diagrammatically shown in the form of a looped coil having a plurality of fins 23 secured thereto for air cooling.

In absorber 13 the rich gas mixture flows counter-current to downwardly flowing weak absorption liquid which enters through a conduit 24. The absorption liquid absorbs refrigerant vapor from the inert gas, and inert gas weak in refrigerant vapor flows from absorber 13 through an outer conduit 25 of gas heat exchanger 22 and conduit 20 into the upper part of evaporator 12.

The circulation of gas in the gas circuit including evaporator 12 and absorber 13 is due to the difference in specific weight of the columns of rich and weak gas. Since the rich gas is heavier than the weak gas, force is produced within the system for causing flow of rich gas toward absorber 13 and flow of weak gas toward evaporator 12.

Enriched absorption liquid flows from absorber 13 into an accumulation vessel 26. From vessel 26 enriched liquid flows through an inner conduit 27 of a liquid heat exchanger 28 to a coil 29 which is disposed about the lower end of flue 15. Liquid is raised by vapor-lift action from coil 29 through a tube 30 into the upper part of generator 10. Refrigerant vapor expelled out of solution in generator 10, together with refrigerant vapor entering through tube 30, flows upwardly through conduit 16 into condenser 11, as explained above.

The weakened absorption liquid from which refrigerant has been expelled flows from generator 10 through outer conduit 31 of liquid heat exchanger 28 and conduit 24 into the upper part of absorber 13, as will be described in detail hereinafter. This circulation of absorption liquid is effected by raising of liquid by vapor-lift action in generator.

A vent conduit 32 is connected to the upper part of chamber 18 and to the gas circuit, as at the upper end of gas heat exchanger 22, for example. The conduit 32 extends upwardly from chamber 18 and then downwardly to gas heat exchanger 22, whereby any gas which may pass through condenser 11 can flow to the gas circuit and not be trapped in the condenser.

In accordance with this invention, in order to effect a lower concentration of refrigerant in absorption liquid entering absorber 13 through conduit 24, an auxiliary or branch circuit is provided for inert gas into which refrigerant fluid evaporates from weak absorption liquid. The auxiliary or branch circuit in Fig. 1 includes a vaporizer 33. The upper part of one end of vaporizer 33 is connected by a conduit 34 to a lower part of absorber 13. The upper part of the opposite end of vaporizer 33 is connected by a conduit 35 to an intermediate part of absorber 13.

The weakened absorption solution from which refrigerant has been expelled in generator 10 is conducted from the lower part of the latter by a conduit 36 to one end of vaporizer 33. From the opposite end of vaporizer 33 absorption solution is conducted through a conduit 37 to the outer conduit 31 of liquid heat exchanger 28.

The vaporizer 33 is arranged in thermal exchange relation with vapors expelled from generator 10 and flowing to condenser 11. To this end vaporizer 33 is provided with a jacket 38 which is connected in the lower part of conduit 16. To permit draining of condensate accumulating in jacket 38, a drain conduit 39 is connected thereto and also to conduit 35 at a level below jacket 38.

During operation of the system shown more or less diagrammatically in Fig. 1 and just described, the rich mixture of refrigerant vapor and inert gas flows from evaporator 12 to absorber 13. By providing the auxiliary or branch circuit, a part of such gas flows upward through conduit 34 into vaporizer 33 and into the presence of weak absorption solution entering through conduit 36 from generator 10. In vaporizer 33 refrigerant fluid evaporates and diffuses into the rich gas mixture from weak absorption solution.

In the arrangement shown, the generator vapors flow through jacket 38 and in thermal exchange relation with weak absorption solution in vaporizer 33. The generator vapor usually is a mixture of refrigerant vapor and absorption liquid vapor; and, when ammonia and water are employed as the refrigerant and absorption liquid, for example, the generator vapor usually is a mixture of ammonia vapor and water vapor.

Due to the difference in boiling points of ammonia and water, the water vapor may be removed from ammonia by cooling the mixture to condense out the water. This is usually termed rectification and the latent heat of condensation resulting from condensation of water vapor is referred to as heat of rectification.

The evaporating temperature of refrigerant fluid is a function of the partial vapor pressure of refrigerant vapor, the evaporating temperature being higher the greater the amount of refrigerant vapor contained in the gas mixture. By flowing the generator vapors in thermal exchange relation with vaporizer 33, therefore, heat of rectification is effectively utilized to effect evaporation of refrigerant fluid into rich gas.

The temperature in generator 10 is a gradient, the temperature being highest in the lower part of the generator from which region weakened absorption solution is conducted to vaporizer 33. The heat of liquid of the weak absorption solution entering vaporizer 33 is also utilized to effect evaporation of refrigerant fluid into rich gas. Due to evaporation of refrigerant fluid, heat of liquid is abstracted from weak absorption solution, thereby effecting cooling of the latter. With the temperature of the weak absorption solution below the temperature of the generator vapors leaving the upper part of generator 10, heat of rectification is transferred to weak absorption solution in vaporizer 33.

By evaporating refrigerant fluid in vaporizer 33 from weak absorption solution, the concentration of refrigerant in solution is further lowered. This may be referred to as a stripping action, whereby the weak absorption solution is stripped of refrigerant and its ability to absorb refrigerant is increased.

The rich gas and weak absorption liquid flow in opposite directions or are in counter-flow in vaporizer 33. The weakened absorption liquid flows from vaporizer 33 through conduit 37 into outer conduit 31 of liquid heat exchanger 28. In the latter heat is transferred from weakened absorption liquid flowing to absorber 13 to enriched absorption liquid flowing to generator 10. The weak absorption liquid which has been cooled in liquid heat exchanger 28 then flows through conduit 24 into the upper part of absorber 13.

As explained above, downwardly flowing absorption liquid in absorber 13 absorbs refrigerant vapor from an inert gas. Since the concentration in refrigerant of the weak absorption liquid has been lowered in vaporizer 33, the absorption liquid entering absorber 13 has the ability to absorb a greater amount of refrigerant vapor from inert gas. The rich gas in vaporizer 33 flows therefrom through conduit 35 into intermediate part of absorber 13. This gas, together with gas flowing upwardly through the lower part of absorber 13, flows upwardly through the absorber and counter-current to the absorption liquid.

The absorption liquid condensing out of the generator vapors in jacket 38 drains through conduit 39 into conduit 35, and thence flows through the latter into absorber 13. The condensate returned to the absorption liquid circuit in this manner mixes with the downwardly flowing absorption liquid.

By making the weak absorption liquid weaker with the arrangement provided, several advantages in the operation of the refrigeration system may be effected. By evaporating refrigerant fluid into inert gas from weak absorption liquid, a lower refrigeration temperature may be effected. The evaporating temperature of refrigerant fluid in evaporator 12 is a function of the partial vapor pressure of refrigerant vapor. The more effectively refrigerant vapor is absorbed from inert gas in absorber 13, the less refrigerant vapor will be contained in the inert gas entering evaporator 12. By further reducing the amount of refrigerant vapor in the inert gas introduced into evaporator 12, the partial vapor pressure of refrigerant in such gas will be less, whereby evaporation of refrigerant fluid will be effected at a lower temperature.

By evaporating refrigerant fluid into inert gas from weak absorption solution, the refrigeration system may be operated at lower generator temperatures to produce the same evaporator temperature as a system not provided with the present improvement. With the generator being operated at lower temperatures, the system may be charged with an absorption solution having a higher concentration of refrigerant, thereby increasing the operating efficiency with less rectifier losses.

If it is desired to introduce weak inert gas into vaporizer 33, that is, inert gas weak in refrigerant vapor, the lower end of conduit 34 may be connected to a part of absorber 13 where the gas has already been weakened by the absorption of refrigerant vapor into absorption solution.

In Fig. 2 is diagrammatically illustrated a modification of the embodiment shown in Fig. 1 with similar parts designated by the same reference numerals. In Fig. 2 the auxiliary or branch circuit for inert gas is provided by connecting conduit 34' to the lower end of inner conduit 21 of gas heat exchanger 22. The lower end of conduit 35' is connected to the lower end of absorber 13. In this modification a part of the rich gas flowing from evaporator 12 passes through vaporizer 33 wherein evaporation of refrigerant fluid from weak absorption solution takes place. The enriched gas flows from vaporizer 33 through conduit 35' into the lower part of absorber 13 along with the rich gas flowing directly from evaporator 12 to absorber 13. With this arrangement the gas enriched in vaporizer 33 flows upwardly through the entire absorber 13.

The modification more or less diagrammatically illustrated in Fig. 3 differs from Figs. 1 and 2 in that a separate gas circuit is provided for circulating inert gas through vaporizer 33. The system in Fig. 3 generally is similar to the systems of Figs. 1 and 2 with similar parts designated by the same reference numerals. While a vertical type gas heat exchanger is illustrated in Figs. 1 and 2, a horizontal type gas heat exchanger 22' is shown in Fig. 3.

Rich gas flows from the lower part of evaporator 12 through an outer passage 25' of gas heat exchanger 22', and thence through conduit 40 into the lower part of absorber 13. In absorber 13 the rich gas mixture flows counter-current to weak absorption solution which enters through conduit 24. Gas weak in refrigerant vapor flows from absorber 13 through a conduit 41, a plurality of tubes 21' forming an inner passage of gas heat exchanger 22', and conduit 42 to the upper part of evaporator 12.

Enriched absorption solution flows from the lower part of absorber 13 through an inner passage of liquid heat exchanger 43 and a conduit 44 to the upper part of an auxiliary absorber 45 which forms part of the separate gas circuit for vaporizer 33. The absorber 45 is diagrammatically shown in the form of a looped coil having a plurality of cooling fins 46 for air cooling.

Gas entering the lower part of absorber 45 through conduit 47 flows counter-current to downwardly flowing absorption liquid. The absorption liquid absorbs refrigerant vapor from inert gas, and gas deprived of refrigerant vapor flows through a conduit 48, outer passage 49 of a gas heat exchanger 50, and a conduit 51 into vaporizer 33. Refrigerant fluid evaporates and diffuses into the gas from weak absorption liquid, as explained above, thereby further weakening the concentration of refrigerant in the absorption liquid. The gas enriched in refrigerant vapor flows from vaporizer 33 through a conduit 52, a plurality of tubes 53 forming an inner passage of gas heat exchanger 50, and conduit 47 to the lower part of absorber 45.

The absorption liquid condensing out of the generator vapors in jacket 38 drains through conduit 39 into conduit 52. From the looped portion of conduit 52 the condensate drains through a conduit 53a into accumulation vessel 54 into which enriched absorption liquid flows from the lower part of absorber 45.

From vessel 54 enriched absorption liquid flows through the inner passages of liquid heat exchangers 55 and 56 to coil 28 which is disposed about the lower end of generator flue 15. Liquid is raised through conduit 30 by vapor-lift action, as explained above, and weak absorption liquid flows from the lower part of generator 10 through a conduit 57 into the outer passage of liquid heat exchanger 56. From the latter weak absorption liquid flows through conduit 36 to vaporizer 33 in which the concentration of refrigerant in the absorption liquid is reduced. The weakened absorption liquid flows from vaporizer 33 through conduit 37, outer passage of liquid heat exchanger 55, a conduit 58, outer passage of liquid heat exchanger 43, and conduit 24 to the upper part of absorber 13.

As in Figs. 1 and 2, the jacket 38 in Fig. 3 is connected to the lower part of conduit 16 and at a region where the generator vapors are at a relatively high temperature. As explained above, the heat of rectification is utilized to effect evaporation of refrigerant fluid from weak absorption solution. The air-cooled rectifier 17 is provided in conduit 16 above vaporizer 33 and any rectification not effected in the vaporizer can take place therein.

Due to the temperature gradient in generator 10, the weak absorption solution leaves the lower part of generator 10 at a higher temperature than the generator vapors flowing from the upper part of the generator. In order that weak absorption solution entering vaporizer 33 will be approximately at the same temperature as the generator vapors entering jacket 38, the liquid heat exchanger 56 may be provided at the lower end of generator 10 to effect the necessary reduction in temperature of the weak absorption solution.

In place of liquid heat exchanger 56 the conduits 36 and 37 may be arranged in heat exchange relation, as shown in the modification illustrated in Fig. 2. When it is desired to maintain vaporizer 33 at a relatively high temperature the liquid heat exchanger 56 may be omitted and the lower end of conduit 36 connected directly to the lower part of generator 10, as shown in Fig. 1.

Since weak absorption solution flowing from vaporizer 33 is conducted in heat exchange relation with enriched absorption solution flowing to generator 10, it is desirable to insulate conduits 36 and 37 and also the vaporizer 33. All of these parts, along with generator 10 and liquid heat exchangers 55 and 56, may be embedded in suitable insulation, as indicated by the dotted line 59 in Fig. 3.

The gas heat exchanger 50 is provided in the separate or auxiliary gas circuit to effect preheating of gas flowing from auxiliary absorber 45 to vaporizer 33. Since the rate at which gas circulates in the separate gas circuit is relatively small, the dimensions of the auxiliary gas heat exchanger 50 need not be very great. The rate at which gas circulates in the separate gas circuit is considerably lower than in the main gas circuit and may be from one-fifth to one-fifteenth the rate of gas circulation in the main gas circuit. In the auxiliary gas circuit, as in the main gas circuit, circulation of gas is due to the difference in specific weight of the columns of gas, of which one column contains a greater amount of refrigerant vapor and is heavier than the other column of gas.

In order to equalize the pressures in the main gas circuit and auxiliary or otherwise separate gas circuit, connecting conduit 60 is provided, as shown in Fig. 3. The conduit 60 is preferably connected to the gas circuits at regions where the partial pressures of refrigerant vapor are approximately the same. With such an arrangement, the effect of one gas circuit on the other is reduced to a minimum.

Figure 4:
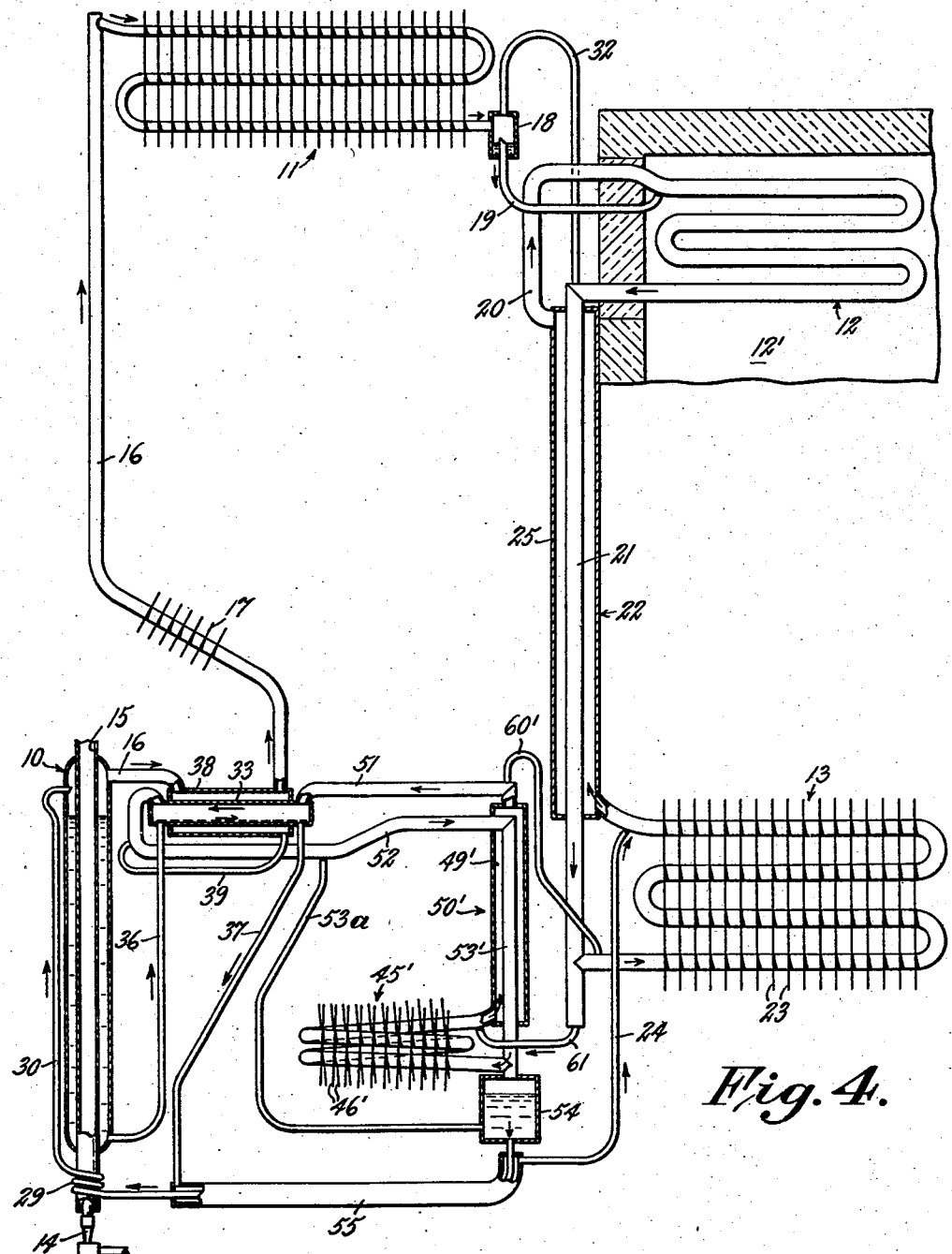
Fig. 4 illustrates a further modification of the invention shown in Fig. 3.

In Fig. 4 is illustrated a further modification which is similar to Fig. 3 and in which the main and auxiliary gas heat exchangers are of the vertical type. The refrigeration system is like that shown in Figs. 1 and 2 with parts previously described designated by the same reference numerals. In Fig. 4 enriched absorption solution flows from the lower part of absorber 13 through a conduit connection 61 into the upper part of auxiliary absorber 45'. Gas entering the lower part of absorber 45' through conduit 53' flows counter-current to the downwardly flowing enriched absorption solution. Gas deprived of refrigerant vapor in absorber 45' flows through outer conduit 49' of gas heat exchanger 50' and conduit 51 into vaporizer 33. From vaporizer 33 gas enriched in refrigerant vapor flows through conduit 52 and inner conduit 53' of gas heat exchanger 50' into the lower part of absorber 45'.

Enriched absorption solution flowing into vessel 54 flows therefrom through the inner passage of liquid heat exchanger 55 to generator 10. From generator 10 weakened absorption solution flows through conduit 36 to vaporizer 33 where refrigerant fluid evaporates in the presence of gas. The weakened absorption solution, after being stripped of refrigerant fluid in the vaporizer, flows through conduit 37, outer passage of liquid heat exchanger 55, and conduit 24 into the upper part of absorber 13. In this modification the liquid heat exchanger 43 in Fig. 3 has been omitted. When the liquid heat exchanger 43 in Fig. 3 is eliminated, it may be replaced by making liquid heat exchanger 55 larger.

While several embodiments of the invention have been shown and described, such variations and modifications are contemplated which fall within the true spirit and scope of the invention, as pointed out in the following claims.

What is claimed is:

1. In the art of refrigeration with a system using inert gas in which refrigerant fluid is separated from absorption liquid by distillation, the improvement which consists in flowing weak liquid in the presence of inert gas and at the same time in thermal exchange relation with distillation vapors.

2. A method of refrigeration with an absorption type system having a generator, two absorbers and a liquid heat exchanger provided with a plurality of passages, which includes conducting enriched absorption liquid from one of said absorbers in series through one passage in said heat exchanger and then through said other absorber to said generator, and conducting weak absorption liquid from said generator through another passage in said heat exchanger and then to said one absorber.

3. In a refrigeration system of an absorption type using inert gas and in which refrigerant fluid is distilled from solution in liquid solvent, means for conducting weak solution in thermal exchange relation with distillation vapors, and means for circulating inert gas in the presence of weak solution while such solution is in thermal exchange relation with distillation vapors.

4. A method of refrigeration which includes the steps of evaporating refrigerant fluid in the presence of auxiliary inert fluid to produce a refrigerating effect, absorbing refrigerant fluid out of the auxiliary fluid into absorption liquid, expelling refrigerant fluid from the absorption liquid by heating, and utilizing heat from the expelled refrigerant fluid to heat absorption liquid from which refrigerant fluid has been expelled, and carrying out this heating of liquid by expelled vapor while the liquid is in the presence of auxiliary inert fluid, thereby rectifying the expelled vapor and further weakening the absorption liquid, and utilizing the weakened absorption liquid in said absorption step.

5. In an absorption type refrigeration system containing inert auxiliary fluid and including a generator and an absorber, means for conducting absorption liquid from said generator into the presence of auxiliary fluid and thence to said absorber, and means for conducting heat of rectification from vapor produced in said generator to the absorption liquid in the presence of the auxiliary fluid to further weaken the absorption liquid.

6. An absorption refrigeration system including a generator, an absorber, a circuit for absorption liquid including said generator and said absorber and a vaporizer, the latter being connected in said circuit so that absorption liquid flows therethrough in its path of flow from said generator to said absorber, means for conducting vapor from said generator in heat transfer relation to said vaporizer, and means for flowing inert gas through said vaporizer.

7. An absorption refrigeration system including a generator, an absorber, a liquid circuit including said generator and said absorber and a vaporizer, the latter being connected in said circuit so as to conduct liquid in its path of flow from said generator to said absorber, means to conduct inert gas to and from said vaporizer, an element in heat exchange relation with said vaporizer, means for conducting vapor from said generator to said element, and a conduit for draining liquid from said element.

ALVAR LENNING.
PER PAUL STRANDBERG.